(12) United States Patent
Ueda et al.

(10) Patent No.: US 6,226,180 B1
(45) Date of Patent: *May 1, 2001

(54) ELECTRONIC APPARATUS HAVING A HEAT DISSIPATION MEMBER

(75) Inventors: Akira Ueda; Masumi Suzuki; Minoru Hirano; Toyokazu Hamaguchi; Shigeru Hidesawa, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,728

(22) Filed: May 22, 1997

(30) Foreign Application Priority Data

Oct. 11, 1996 (JP) .................................................. 8-270245

(51) Int. Cl.⁷ ...................................................... H05K 7/20

(52) U.S. Cl. ........................... 361/689; 361/690; 361/704

(58) Field of Search ................................. 165/80.2, 185; 174/16.3; 257/766–767, 712–713; 361/687–690, 704, 707, 711, 715, 717–718, 722

(56) References Cited

U.S. PATENT DOCUMENTS

| 5,402,311 | * | 3/1995 | Nakajima | 361/711 |
| 5,459,640 | * | 10/1995 | Moutrie et al. | 361/814 |
| 5,646,824 | | 7/1997 | Ohashi et al. . | |
| 5,751,550 | * | 5/1998 | Korinsky | 361/690 |

FOREIGN PATENT DOCUMENTS

| 0 702 287 | 3/1996 | (EP) . |
| 61-294528 | 12/1986 | (JP) . |
| 4-284519 | 10/1992 | (JP) . |
| 4-290107 | 10/1992 | (JP) . |
| 4-354010 | 12/1992 | (JP) . |
| 5-341874 | 12/1993 | (JP) . |
| 6-318124 | 11/1994 | (JP) . |
| 8-8567 | 1/1996 | (JP) . |
| 8-087354 | 4/1996 | (JP) . |
| 8-162576 | 6/1996 | (JP) . |

* cited by examiner

Primary Examiner—Gregory Thompson
(74) Attorney, Agent, or Firm—Staas & Halsey LLP

(57) ABSTRACT

The present invention relates to a heat dissipation structure for a notebook type computer, capable of effectively dissipating heat generated from a high temperature element (such as a CPU). The heat dissipation structure comprises a main body, a display device and a hinge shaft for coupling the main body with the display device, wherein the hinge shaft is arranged above the main body at a distance therefrom, and a heat dissipation means is provided in the main body.

25 Claims, 11 Drawing Sheets

ELECTRONIC APPARATUS HAVING A HEAT DISSIPATION MEMBER

BACKGROUND OF THE INVENTION

1. Field of the Invention

The invention relates to a heat dissipation structure for a notebook type computer, more specifically to a heat dissipation structure for a notebook type computer for radiating heat from a body portion beneath a hinge shaft of an openable/closable cover for a main body.

2. Description of the Related Art

Recently, personal computers have gradually been miniaturized to a portable notebook size as shown in FIGS. 20A and 20B. This is constituted by a main body 1 having a housing 5 with a keyboard therein (not shown) and accommodating therein a CPU 2, a HDD 3, a PC card 4 and so on therein, a display device 6, and a hinge for coupling the display device 6 to the main body 1 so that the display device 6 forms an openable/closable cover for housing 5 the. The keyboard has a plurality of keys having keytops arranged in a matrix manner with a small gap between adjacent keys. Information input from the keyboard is processed by CPU 2 in the main body and displayed on the display device 6.

The notebook type computer described above generates heat from high temperature elements built into the main body (for example, a CPU), which heat must be dissipated therefrom. In the prior art, a heat dissipation plate 7 made of aluminum or copper is attached to the high temperature element to radiate the heat in the interior of the computer.

According to the prior art heat dissipation structure described above, it is possible to equalize the temperature in the interior of the computer, but the temperature may rise as a whole to exceed an allowable limit of other elements having a lower resistance to heat (such as an HDD, a PC card, an FDD, a CD-ROM or the like).

The present invention has been made to solve the above problem inherent in the prior art by providing a heat dissipation structure for a notebook type computer capable of effectively carrying out the heat dissipation from a high temperature element (such as a CPU).

SUMMARY OF THE INVENTION

Accordingly, an object of the present invention is to provide a heat dissipation structure for a notebook type computer which is capable of effectively dissipating heat from a high temperature element (such as a CPU).

To achieve the above object, the present invention provides a heat dissipation structure, for a notebook type computer, comprising: a main body including electrical elements in a housing; a display device; a hinge shaft for coupling the main body with the display device, said hinge shaft being arranged above the main body at a distance therefrom; and a heat dissipation device provided in the main body adjacent to the hinge shaft.

According to one aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate of a T or L-shape is provided in the main body. According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate is provided in the main body, and an opening is provided in a housing wall at a position above a heat dissipation section of the heat dissipation plate. Also, the opening may be provided in the housing wall at a position beneath at least one end of the heat dissipation section of the heat dissipation plate.

According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate having a plurality of fins in a heat dissipation section thereof is provided in the main body. According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate having a heat pipe in a heat dissipation section thereof is provided in the main body.

According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate of a T or L-shape is provided in the main body, and an opening is provided in a central zone of a heat dissipation section of the heat dissipation plate. According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate comprising a heat dissipation section having a channel-shaped cross-section is provided in the main body.

According to another aspect of the present invention, a heat dissipation structure for a notebook type computer is provided, comprising a main body, a display device and a hinge shaft for coupling the main body with the display device; said hinge shaft being arranged above the main body at a distance therefrom, a duct-shaped tubular heat dissipation section is provided in the main body, wherein an inclined lower opening of the duct is used as an intake port for sucking air and an inclined upper opening of thereof is used as an exhaust port. An exhaust fan may be provided in the tubular heat dissipation section. Also, the duct-shaped tubular heat dissipation section may be cylindrical. A louver may be provided midway of the tubular heat dissipation section, for sucking part of the air in the housing and exhausting the same therefrom. A baffle may be provided for partitioning the interior of the tubular heat dissipation section into an outer air flow-in chamber and an inner air flow-in chamber. The tubular heat dissipation section may be of a T-shaped profile.

According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate partly formed of a metal piece is provided in the main body, and one end of the metal piece is connected to a second heat dissipation plate provided in a lower part of a display-mounting portion or a rear surface thereof. An outer surface of the metal piece may be covered with a resin. According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate is provided in the main body, and an opening is provided in a housing wall at a position above a heat dissipation section of the heat dissipation plate, and a duct is provided in a display-mounting part and connected to the opening via a flexible pipe. An exhaust fan may be provided in the duct.

According to another aspect of the present invention, a heat dissipation structure for a notebook type computer is provided, comprising a main body, a display device and a hinge shaft for coupling the main body with the display device; said hinge shaft being arranged above the main body at a distance therefrom, a heat dissipation plate is provided in the main body, in which is formed a cavity wherein an operating liquid for transporting heat is sealed.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

Figure 1A:
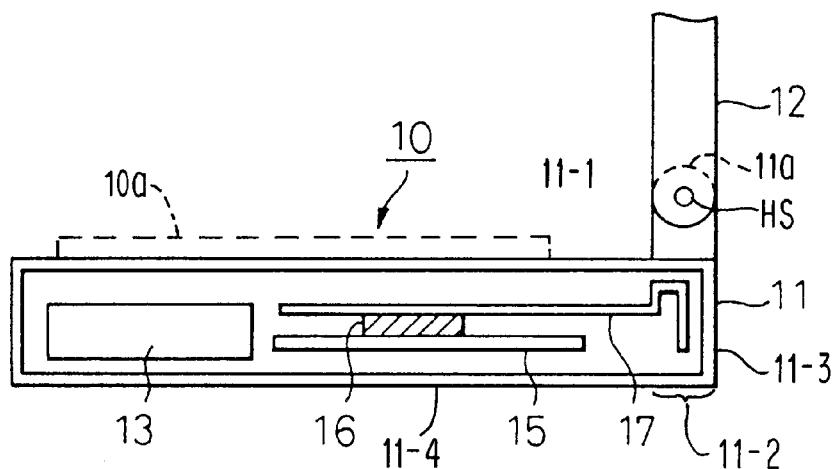
FIG. 1A is a cross-sectional view.
Figure 1B:
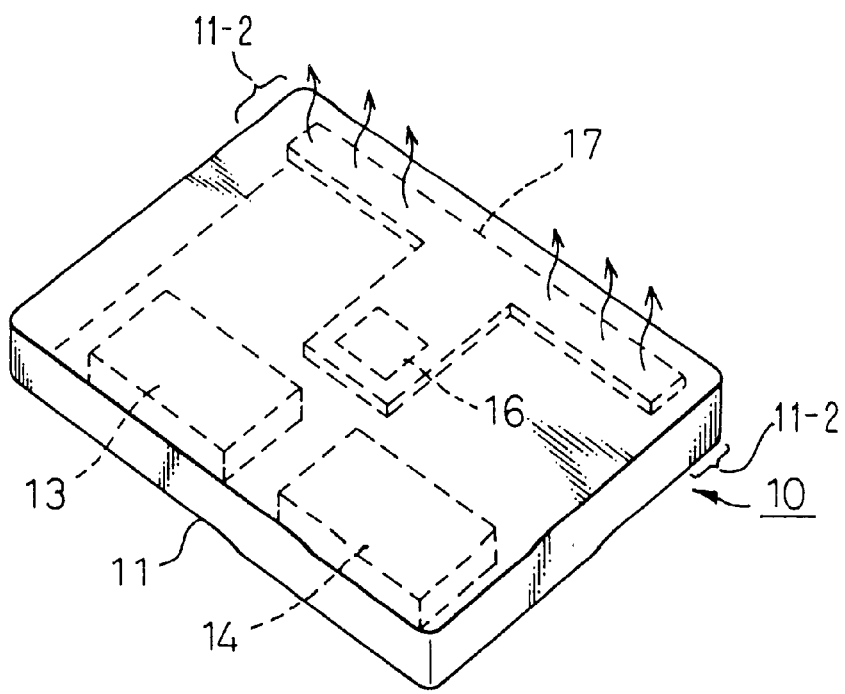
FIG. 1B is a see-through view of a first embodiment of a heat dissipation structure for a notebook type computer according to the invention.

FIGS. 1A and 1B illustrate a heat dissipation structure for a notebook type computer according to a first embodiment of the present invention; wherein FIG. 1A is a cross-sectional view and FIG. 1B is a see-through view of a main body. In the drawings, reference numeral 10 denotes a main body of the notebook type computer; 11 a housing of the main body; and 12 a display device. A keyboard or other input device 10a' (shown in phantom lines) is attached to the upper surface 10' of the main body 10, and a HDD (hard disk drive) 13, a PC card 14, a CPU 16 mounted onto a circuit board 15 and so on are accommodated in the housing 11. A heat dissipation plate 17 made of a heat-conductive metal such as aluminum or copper is attached as a heat dissipation means to the upper surface of CPU 16, and one end of the heat dissipation plate 17 is located in a side zone 11-2 in the interior of and along a perimeter, or peripheral, side wall 11-3 of the housing 11 (and, thus, below a hinge shaft which supports and pivotally couples, the display device 12 to the housing 11). More particularly, the display device 12 is connected by hinge shaft HS to a bracket 11a affixed to the housing 11 and extending upwardly from the upper main surface 11-1 thereof.

The first embodiment of the heat dissipation structure for the notebook type computer thus structured conducts heat generated in high temperature elements such as CPU 16 via the heat dissipation plate 17 to the side zone 11-2 in the interior of the housing 11 and radiates through the side wall 11-3 of the housing 11 to the exterior thereof. Accordingly, it is possible to radiate heat outside the housing without increasing the temperature of other elements having a lower resistance to heat and mounted in a central area of the housing 11.

Figure 2A:
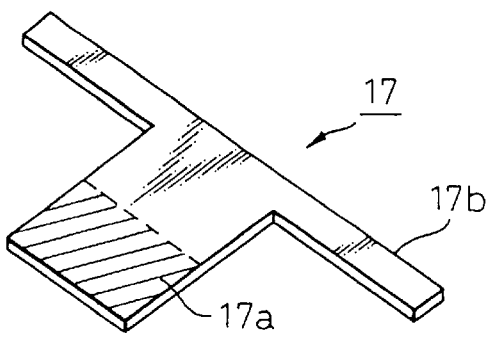
FIG. 2A is a perspective view of a first example.
Figure 2B:
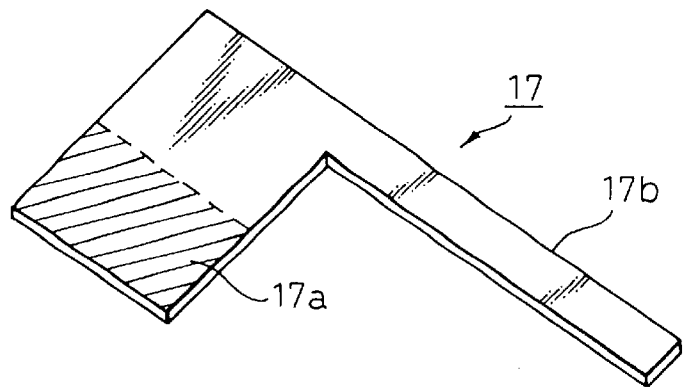
FIG. 2B is a perspective view of a second example, of a heat radiation plate used in a heat dissipation structure for a notebook type computer according to the present invention.

FIGS. 2A and 2B illustrate first and second examples of a heat dissipation plate 17 used in the first embodiment of the heat dissipation structure for a notebook type computer shown in FIGS. 1A and 1B, wherein the heat dissipation plate shown in FIG. 2A is of a T-shape, and that shown in FIG. 2B is of an L shape. In both the drawings, a heat reception section 17a is shown as a hatched portion, which is to be in contact with a high temperature element such as a CPU or similar device, and a heat dissipation section 17b is an elongated portion, which is to be located in the vicinity of the side zone 11-2 at the inside of the wall 11-3 of the housing 11 for the purpose of heat dissipation, whereby a narrow space in the side zone 11-2 can be effectively used to increase the heat dissipation efficiency.

Figure 3:
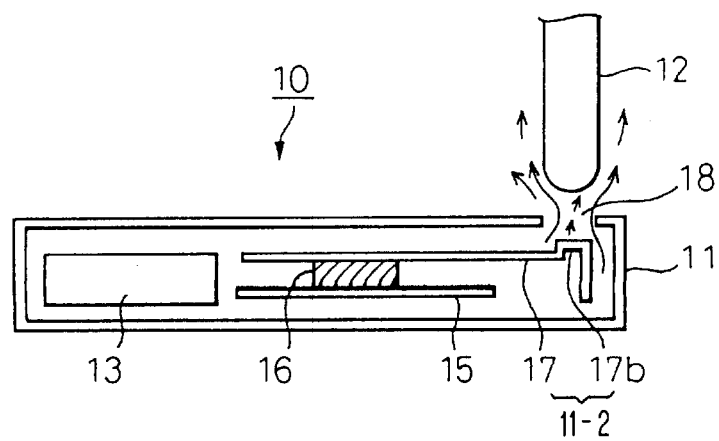
FIG. 3 is a cross-sectional view of a second embodiment of a heat dissipation structure for a notebook type computer according to the present invention.

FIG. 3 is a cross-sectional view of a second embodiment of a heat dissipation structure for a notebook type computer according to the present invention. Similar to the preceding embodiment, reference numeral 10 denotes a main body; 11 a housing; and 12 a display device, and a HDD 13, a circuit board 15, a CPU 16, a heat dissipation plate 17 and so on are accommodated in the interior of the housing 11. A characteristic structure of this embodiment is that an opening 18 for air ventilation is provided at a position above the heat dissipation section 17b of the heat dissipation plate 17 extending to the side zone of the housing 11. This opening 18 may be either one or more, or a plurality of slits may be provided for this purpose.

According to the second embodiment of the heat dissipation structure for a notebook type computer, heat generated by a high temperature element such as CPU 16 is conducted to a side zone of the interior of the housing 11 by the heat dissipation plate 17 and then to the air via the heat dissipation section 17b. The air thus heated is exhausted from the opening 18 to the outside of the housing. Since the heat generated within the housing 11 and dwelling in the upper zone thereof is discharged from the housing in such a manner, the interior temperature of the housing is further lowered compared with the preceding embodiment.

Figure 4A:
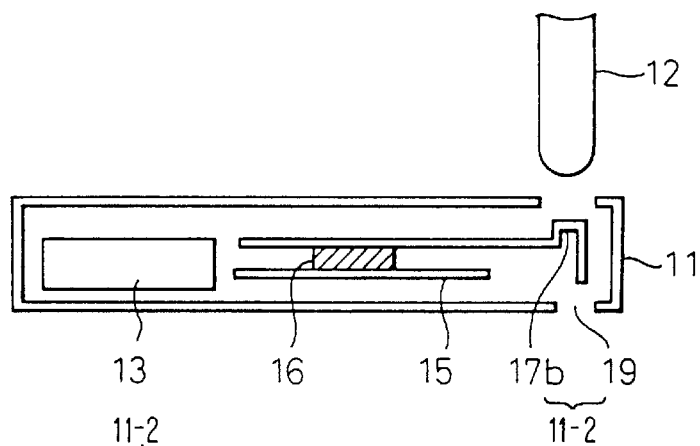
FIG. 4A is a cross-sectional view.
Figure 4B:
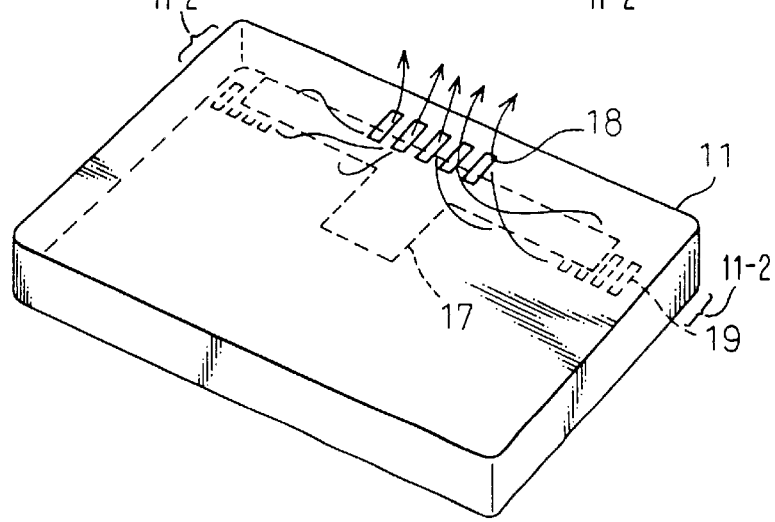
FIG. 4B is a perspective view.
Figure 4C:
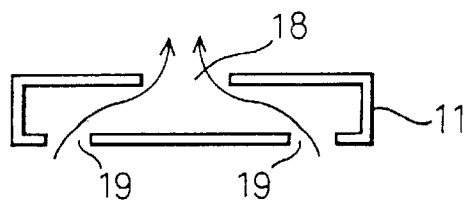
FIG. 4C is a cross-sectional view, of a third embodiment of a heat dissipation structure for a notebook type computer according to the present invention.

FIGS. 4A, 4B, and 4C illustrate a third embodiment of a heat dissipation structure for a notebook type computer according to the present invention, wherein FIG. 4A is a cross-sectional view thereof, FIG. 4B is a perspective view of a main body and FIG. 4C is a cross-sectional view of the main body. This embodiment has a similar structure to those of the preceding embodiments, except that a ventilation opening 19 is provided in the bottom wall of a housing 11 at a position below a heat dissipation section 17b of a heat dissipation plate 17. Preferably, either one slit or more are formed as the opening 19 at a position beneath at least one end of the heat dissipation section 17b of the heat dissipation plate 17.

According to the third embodiment of the heat dissipation structure for a notebook type computer, fresh air is introduced in the arrowed direction from the opening 19 formed in the bottom wall 11-4 of the housing 11 in the vicinity of the heat dissipation section 17b of the heat dissipation plate 17, as shown in FIGS. 4B and 4C, and exhausted from an upper opening 18 in the upper main surface 11-1 after cooling the heat dissipation section 17b, whereby the cooling efficiency is further enhanced compared with the preceding embodiments.

Figure 5A:
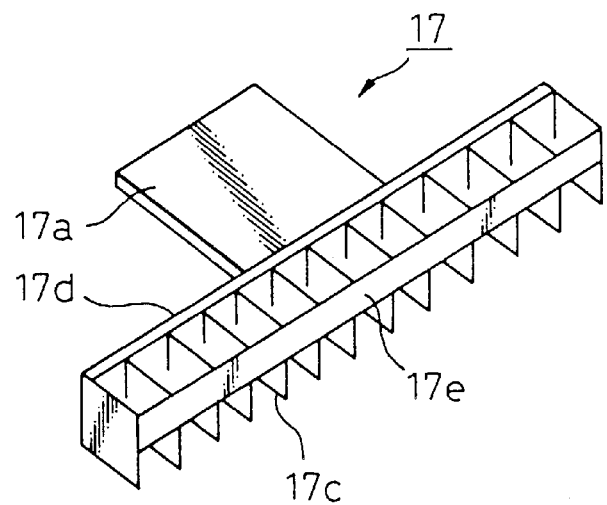
FIG. 5A is a perspective view.
Figure 5B:
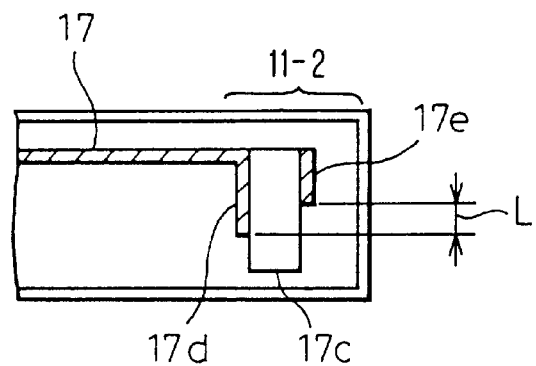
FIG. 5B is a cross-sectional view, of a third example of a heat radiation plate used in a heat dissipation structure for a notebook type computer according to the present invention.

FIGS. 5A and 5B illustrate a third example of a heat dissipation plate used in a heat dissipation structure for a notebook type computer according to the present invention, wherein FIG. 5A is a perspective view of the heat dissipation plate, and FIG. 5B is a cross-sectional view thereof when used in a main body. A characteristic of this heat dissipation plate resides in a heat dissipation section 17b. The heat dissipation section 17b of the heat dissipation plate 17 comprises a plurality of fins 17c arranged parallel to each other in the lengthwise direction while being fixed together by a pair of connecting members 17d, 17e. The connecting member 17d connected to a heat reception section 17a has a larger height than the other connecting member 17e so that a height difference L is created when the fins are fixed together, as shown in FIG. 5B.

According to the third example of the heat dissipation plate used in the heat dissipation structure for a notebook type computer according to the present invention, since a larger heat dissipation area is obtainable by a large number of fins 17c, it is possible to further improve the heat dissipation efficiency compared with the first example.

Figure 6:
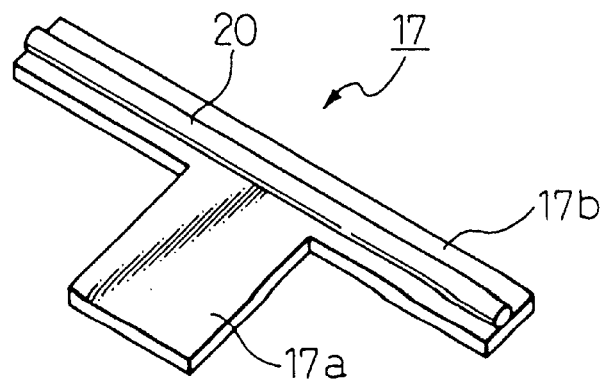
FIG. 6 is a perspective view of a fourth example of a heat radiation plate used in a heat dissipation structure for a notebook type computer according to the present invention.

FIG. 6 illustrates a perspective view of a fourth example of a heat dissipation plate 17 used in a heat dissipation structure for a notebook type computer according to the present invention. This heat dissipation plate 17 is formed of a heat reception section 17a and a heat dissipation section 17b extending leftward and rightward from the heat reception section 17a to form a T-shape, and a heat pipe 20 is attached to the heat dissipation section 17b in the lengthwise direction.

According to the fourth example of the heat dissipation plate used in the heat dissipation structure for a notebook type computer according to the present invention, the heat reception section 17a is brought into contact with a high temperature element during use so that heat generated by the high temperature element is conducted to a central zone of the heat dissipation section 17b. Then, an operating fluid in the heat pipe 20 is evaporated to a vapor which flows in the heat pipe toward the opposite end portion of the heat dissipation section having a lower temperature and loses the heat to transform to a liquid which returns to a central zone of the heat pipe via a wick. The operating fluid transports heat from a central zone to opposite end portions of the heat dissipation section in such a manner. Thus, it is possible to effectively cool a high temperature element such as a CPU.

Figure 7:
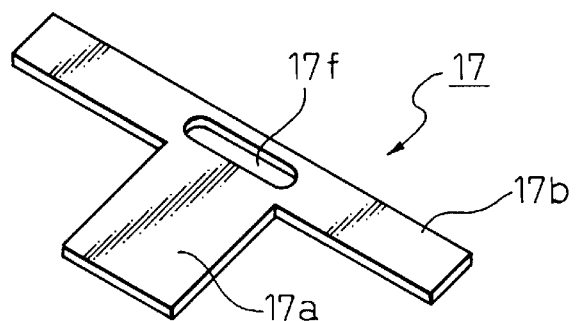
FIG. 7 is a perspective view of a fifth example of a heat radiation plate used in a heat dissipation structure for a notebook type computer according to the present invention.

FIG. 7 illustrates a perspective view of a fifth example of a heat dissipation plate used in a heat dissipation structure for a notebook type computer according to the present invention. This heat dissipation plate 17 is formed of a heat reception section 17a and a heat dissipation section 17b extending leftward and rightward from the heat reception section 17a to form a T-shape, and an opening 17f is provided in a central zone of the heat dissipation plate 17b where a heat pool is liable to be formed. In this connection, although the opening is formed in the T-shaped heat dissipation plate in this drawing, it may be provided in a similar manner to an L-shaped heat dissipation plate.

The heat dissipation plate of the fifth example used in the heat dissipation structure for a notebook type computer according to the present invention is used while causing the heat reception section 17a to be in contact with a high temperature element. Heat generated in the high temperature element is radiated into air while being conducted by the heat dissipation section 17b, during which some of the air flowing along the heat dissipation section 17b passes through the opening 17f to facilitate the air flow and improve the cooling efficiency.

Figure 8:
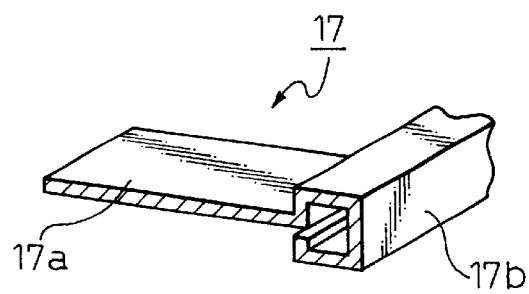
FIG. 8 is a cross-sectional perspective view of a sixth example of a heat radiation plate used in a heat dissipation structure for a notebook type computer according to the present invention.

FIG. 8 illustrates a cross-sectional perspective view of a sixth example of a heat dissipation plate used in a heat dissipation structure for a notebook type computer according to the present invention. A heat dissipation plate 17 is formed of a heat reception section 17a and an elongate heat dissipation section 17b extending leftward and rightward from the heat reception section 17a, wherein the heat dissipation section 17b has a channel-like cross-section, as shown in the drawing.

In the heat dissipation plate of the sixth example used in the heat dissipation structure for a notebook type computer according to the present invention, the surface area of the heat dissipation section 17b is made larger to enhance the cooling efficiency.

Figure 9:
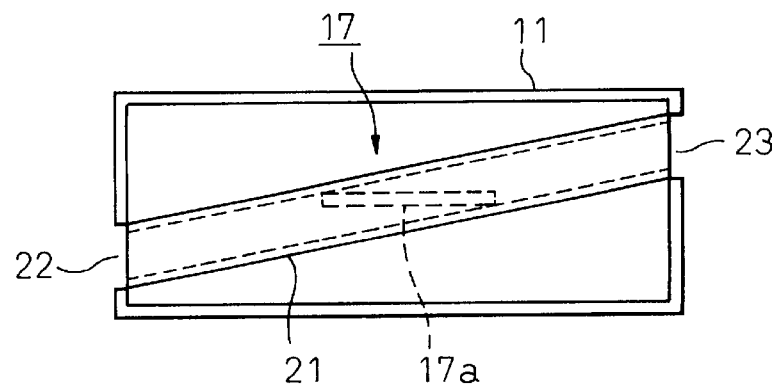
FIG. 9 is a cross-sectional view of a fourth embodiment of a heat dissipation structure for a notebook type computer according to the present invention.

FIG. 9 illustrates a cross-sectional view of a fourth embodiment of a heat dissipation structure for a notebook type computer according to the present invention. A housing 11 and a heat dissipation plate 17 are solely shown in the drawing, and other parts are omitted. According to this embodiment, the heat dissipation plate 17 includes a heat reception section 17a onto be mounted to a high temperature element and an inclined pipe 21 attached to the heat reception section 17a. An intake opening 22 for air is provided in one side wall of the housing 11 at a lower position, while an exhaust opening 23 is provided in the other side wall at a higher position, so that opposite ends of the pipe 21 of the heat dissipation plate 17 are aligned therewith to form a duct structure.

According to the fourth embodiment of the heat dissipation structure for a notebook type computer according to the present invention, the heat reception section 17a is attached to the high temperature element so that heat generated in the high temperature section is conducted to the pipe 21 via the heat reception section 17a. When the temperature of the pipe becomes higher, air in the pipe 21 is heated and moves upwardly in the inclined pipe and is discharged outside the housing from the exhaust opening 23, while fresh air is introduced into the intake opening 22 to effectively cool the high temperature element via the heat reception section 17a.

Figure 10:
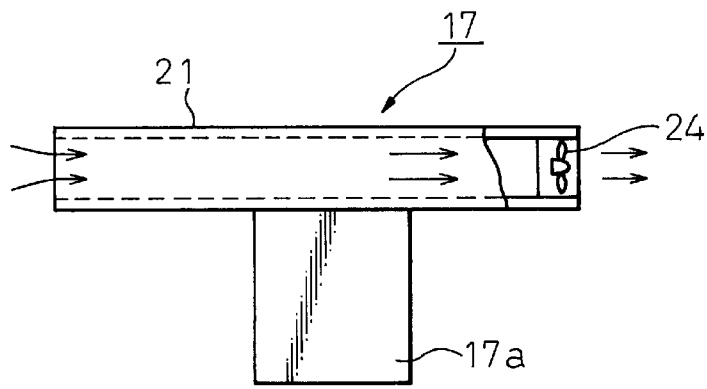
FIG. 10 is a view of a seventh example of a heat radiation plate used in the fourth embodiment of a heat dissipation structure for a notebook type computer according to the present invention.

FIG. 10 illustrates a seventh example of a heat dissipation plate used in the fourth embodiment of the heat dissipation structure for a notebook type computer according to the present invention. A difference between this heat dissipation plate 17 and that described with reference to FIG. 9 is that the pipe 21 is provided with a fan 24, while the remaining structure is the same as the latter.

According to the seventh example of the heat dissipation plate used in the fourth embodiment of the heat dissipation structure for a notebook type computer according to the present invention, since air heated in the pipe 21 is forcibly exhausted by the fan 24, the cooling efficiency is further enhanced compared with the preceding example shown in FIG. 9.

Figure 11:
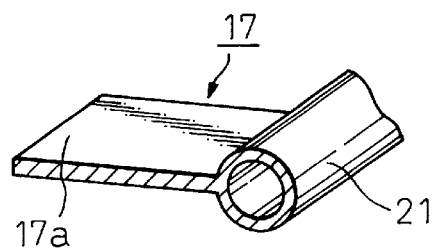
FIG. 11 is a view of a pipe used as the seventh example of the heat dissipation plate in the heat dissipation structure for a notebook type computer according to the present invention.

FIG. 11 illustrates an instance of the pipe 21 in the seventh example of the heat dissipation plate in the fourth embodiment of the heat dissipation structure used for a notebook type computer according to the present invention defined by claim 11, wherein the pipe 21 is cylindrical. This pipe has the same effect as that described with reference to FIG. 10.

Figure 12:
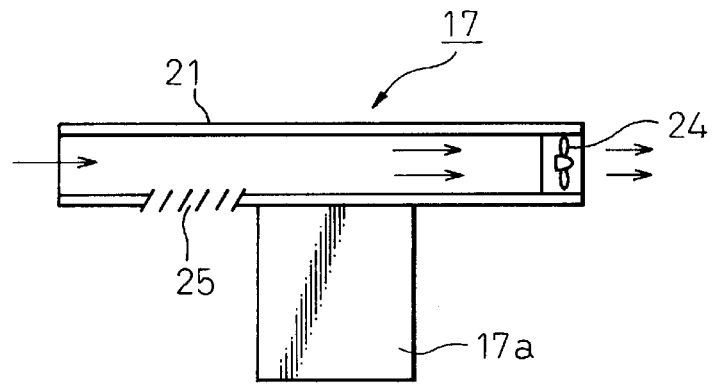
FIG. 12 is a view of an eighth example of a heat dissipation plate used in the heat dissipation structure for a notebook type computer according to the present invention described with reference to FIG. 10.

FIG. 12 illustrates an eighth example of a heat dissipation plate used in the fourth embodiment of the heat dissipation structure for a notebook type computer according to the present invention. A difference between this example and that described with reference to FIG. 10 resides in that a louver 25 is provided midway in the pipe 21, while the remaining structure is the same as the latter.

According to this example, it is possible to cool the high temperature element via the heat reception section 17a and move part of air in the housing from the louver 25 into the pipe to discharge the same out of the housing.

Figure 13:
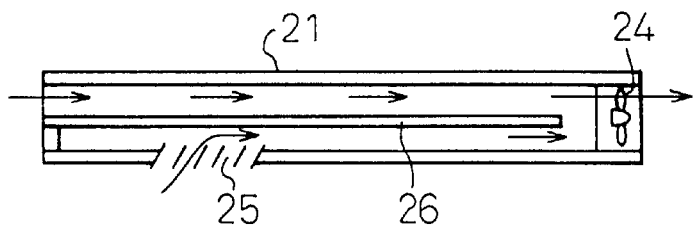
FIG. 13 is a view of a ninth example of a heat dissipation plate used in a heat dissipation structure for a notebook type computer according to the present invention.

FIG. 13 illustrates a ninth example of a heat dissipation plate used in the fourth embodiment of the heat dissipation structure for a notebook type computer according to the present invention. A difference between this example and the eighth example of the heat dissipation plate described with reference to FIG. 12 is that a baffle 26 is provided in the pipe 21 for partitioning the interior thereof into an outer air flow-in chamber and an inner air flow-in chamber, while the remaining structure is the same as the latter. According to this example, since the interior of the pipe is partitioned into the outer air flow-in chamber and the inner air flow-in chamber, the high temperature element can be more reliably cooled with the outer air, and part of air in the housing can be discharged.

Figure 14:
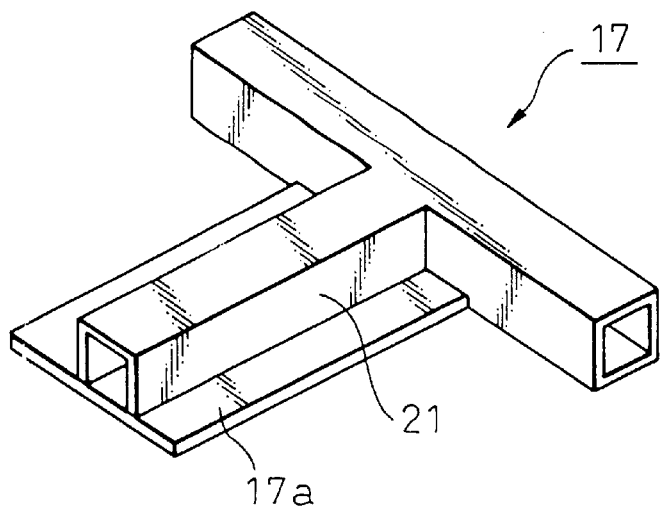
FIG. 14 is a view of a tenth example of a heat dissipation plate used in a heat dissipation structure for a notebook type computer according to the present invention.

FIG. 14 illustrates a tenth example of a heat dissipation plate used in the fourth embodiment of the heat dissipation structure for a notebook type computer according to the present invention. This heat dissipation plate is formed of a heat reception section 17a and a T-shaped pipe 21. According to this heat dissipation plate, it is possible to further effectively conduct heat from the heat dissipation section to the pipe due to an increase in the heat-conductive area of the T-shaped pipe as well as to discharge air in the housing to the outside thereof.

Figure 15:
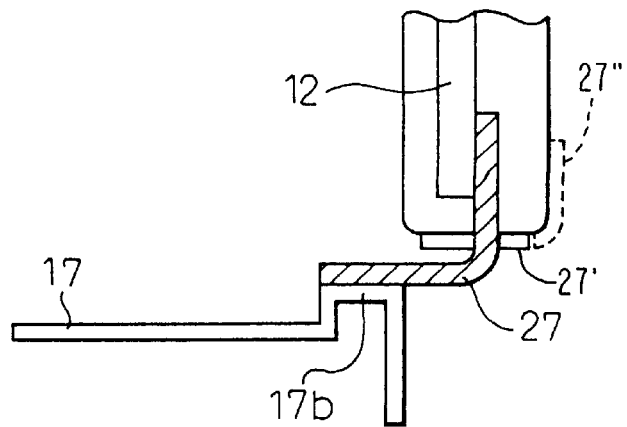
FIG. 15 is a view of an eleventh example of a heat dissipation plate used in a heat dissipation structure for a notebook type computer according to the present invention.

FIG. 15 illustrates an eleventh example of a heat dissipation plate used in the first embodiment of the heat dissipation structure shown in FIGS. 1A and 1B for a notebook type computer according to the present invention. In this example, a metal piece 27 is provided on a heat dissipation section 17b of a T or L-shaped heat dissipation plate 17, and connected at one end thereof to a second heat dissipation plate provided in the lower portion or the rear surface of the display device 12, such as an LCD, shown respectively at 27' and 27". If a flexible sheet is used as the metal piece 27, the opening/closing of the display device is not disturbed. Since the heat dissipation section extends outside the main body, it is possible to carry out the effective heat dissipation.

According to this heat dissipation plate, heat generated in a high temperature element is radiated not only from the heat dissipation section 17a but also from the display device or the second heat dissipation plate through the metal piece 27, whereby the cooling efficiency is enhanced.

Figure 16:
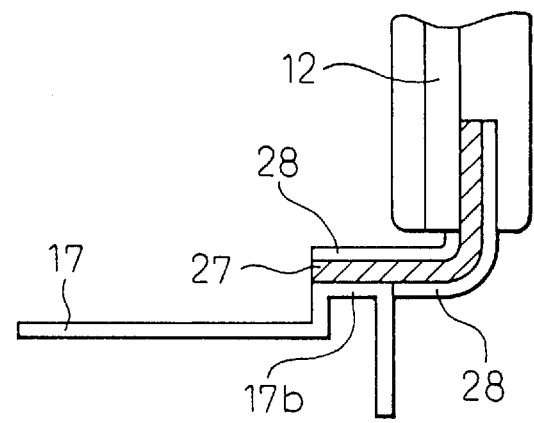
FIG. 16 is a view of a twelfth example of a heat dissipation plate used in a heat dissipation structure for a notebook type computer according to the present invention.

FIG. 16 illustrates a twelfth example of a heat dissipation plate used in the first embodiment of the heat dissipation structure shown in FIGS. 1A and 1B for a notebook type computer according to the present invention. In this example, a metal piece 27 is provided on a heat dissipation section 17b of a T or L-shaped heat dissipation plate 17 and is coated with a resin 28 except for a part to be bonded to the display device 12 or the second heat dissipation plate.

The heat dissipation plate according to this example has the same effect as that of the eleventh example, and particularly prevents the heat from radiating around the metal piece 27 because the metal piece is coated with the resin.

Figure 17A:
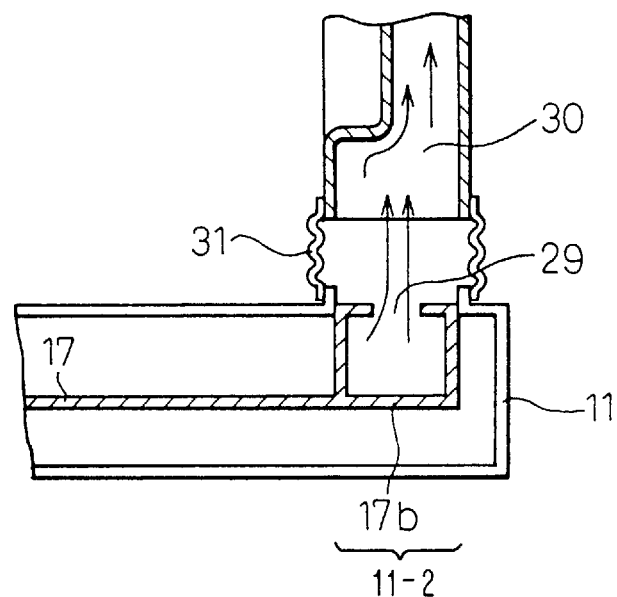
FIG. 17A is a cross-sectional partial view.
Figure 17B:
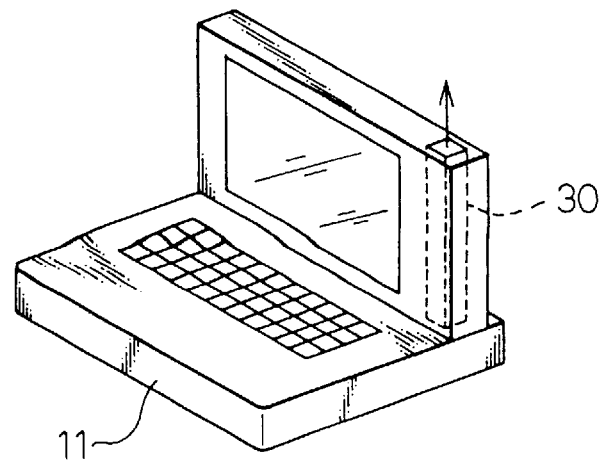
FIG. 17B is a perspective view, of a fifth embodiment of a heat dissipation structure for a notebook type computer according to the present invention.

FIGS. 17A and 17B illustrate a heat dissipation structure for a notebook type computer according to a fifth embodiment of the present invention; FIG. 17A is a cross-sectional view of a main part and FIG. 17B is a perspective view. In the heat dissipation structure of this embodiment, a ventilation opening 29 is provided in the upper wall of a housing 11 at a position opposite to part of a heat dissipation section 17b of a heat dissipation plate 17, and a duct 30 is provided on a cover carrying a display device 12 thereon. A lower end of the duct 30 and the opening 29 in the housing 11 are connected with each other by a flexible pipe 31 made, for example, of rubber or resin.

According to the fifth embodiment of the heat dissipation structure for a notebook type computer thus structured, heated air is introduced from the heat dissipation section 17b of the heat dissipation plate 17 into the duct 30, and discharged outside due to the chimney effect of the duct 30. Therefore, the convection is accelerated in the vicinity of the heat dissipation section 17b to enhance the cooling efficiency.

Figure 18:
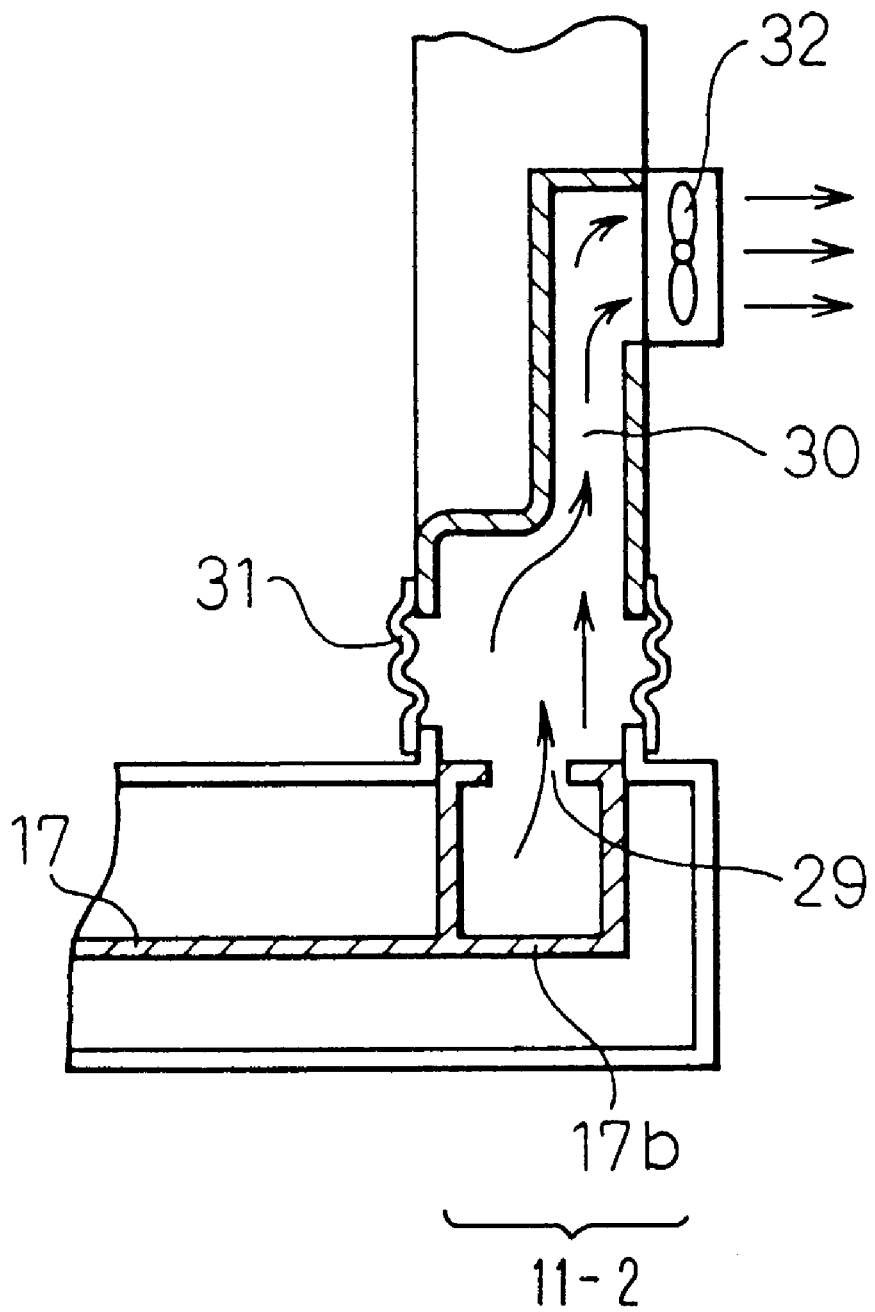
FIG. 18 is a cross-sectional view of a main part of a sixth embodiment of a heat dissipation structure for a notebook type computer according to the present invention.

FIG. 18 illustrates a heat dissipation structure for a notebook type computer according to a sixth embodiment of the present invention. This embodiment is substantially the same as the fifth embodiment of the heat dissipation structure for a notebook computer already described with reference to FIGS. 17A and 17B, except that a fan 31 is provided in the duct 30 in this embodiment. According to this embodiment, it is possible to forcibly exhaust air in the duct 30 and improve the heat dissipation effect due to the heat diffusion caused by the fan 31. In addition, even if there is insufficient space for installing a fan in the display device 12, it is possible to mount the fan on the exterior thereof, as shown.

Figure 19A:
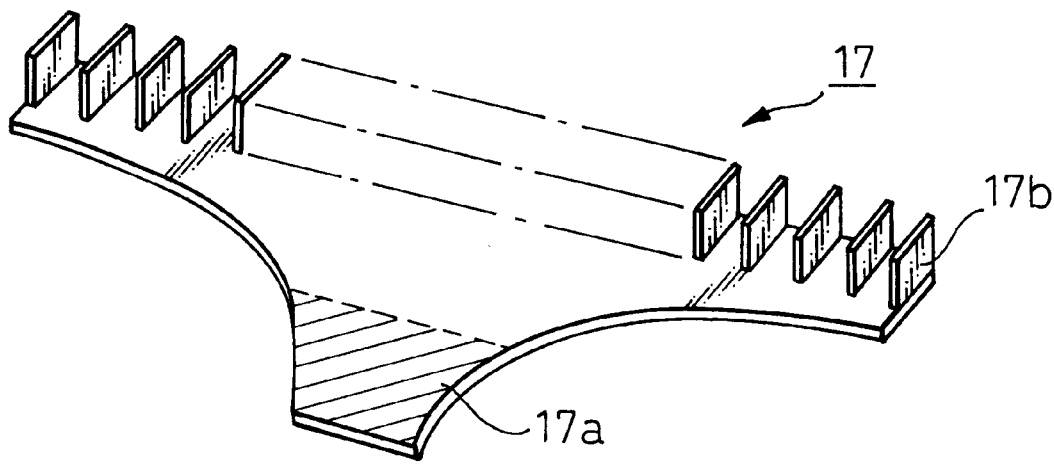
FIG. 19A is a perspective view.
Figure 19B:
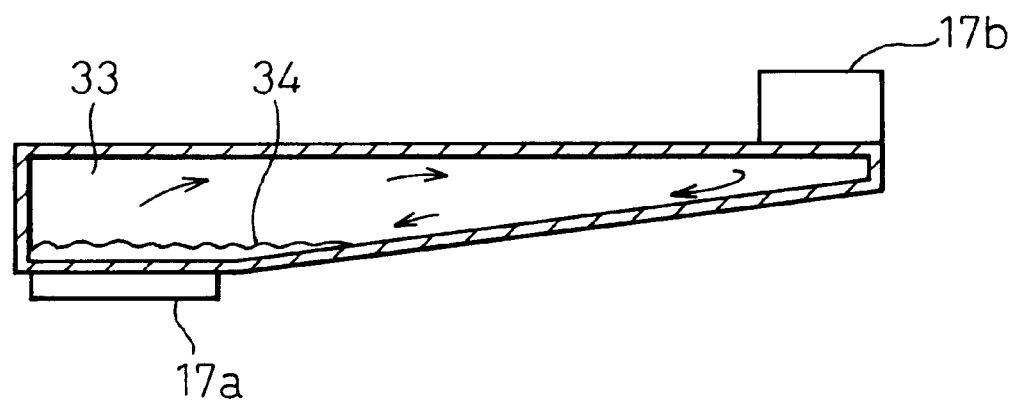
FIG. 19B is a cross-sectional view, of a thirteenth example of a heat dissipation plate used in a heat dissipation structure for a notebook type computer according to the present invention.
Figure 20A:
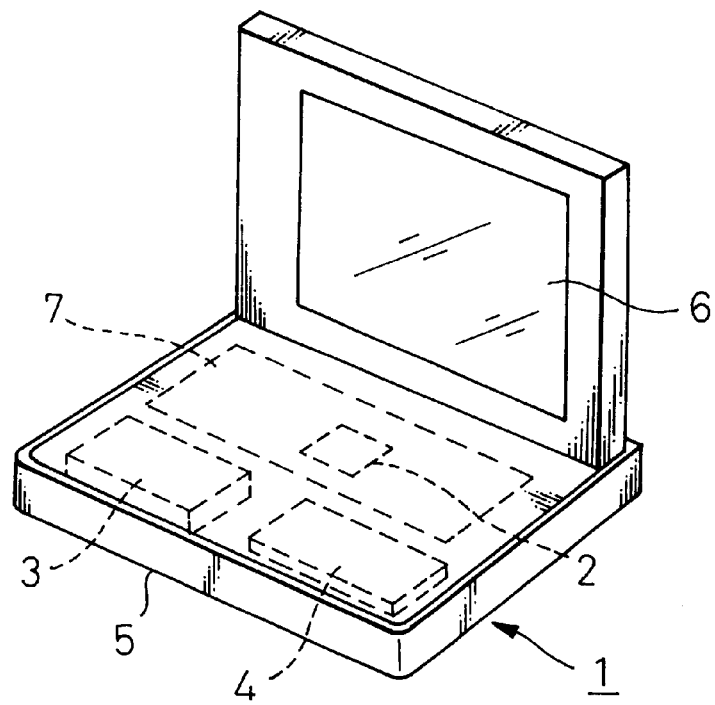
FIG. 20A is a perspective view.
Figure 20B:
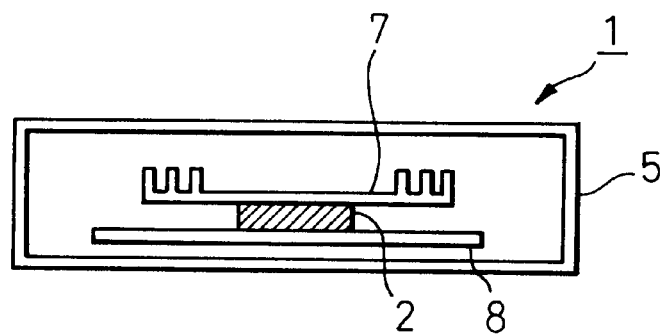
FIG. 20B is a cross-sectional view, of a prior art notebook type computer.

FIGS. 19A and 19B illustrate a thirteenth example of a heat dissipation plate used in the heat dissipation structure for a notebook type computer according to the present invention; FIG. 19A is a perspective view and FIG. 19B is a cross-sectional view thereof. A T or L-shaped heat dissipation plate 17 (in the drawing, a T-shaped plate is illustrated) has a cavity 33 having an inclined bottom wall, in which is sealed an operating fluid 34 for heat transportation (i.e., a heat-exchanged fluid).

According to this heat dissipation plate, heat in the heat reception section 17a causes the operating fluid 34 to evaporate. The vapor reaches the heat dissipation section 17b to radiate the heat and the cooled vapor is transformed back into a liquid phase. Thereafter, the operation fluid in the liquid phase returns to the heat reception section 17a. The above steps are repeated to effectively conduct heat from the heat reception section 17a to the heat dissipation section 17b.

According to the heat dissipation structure for a notebook type computer of the present invention, heat generated in a high temperature element such as a CPU is transported to a side zone of the computer housing so that the heat is dissipated in this limited space, whereby the heat dissipation is carried out without adversely affecting other elements having a lower resistance to heat mounted in a central zone of the computer.

It is to be understood that the invention is by no means limited to the specific embodiments illustrated and described herein, and that various modifications thereof may be made which come within the scope of the present invention as defined in the appended claims.

What is claimed is:

1. A heat dissipation structure in a housing of an electronic apparatus, the housing having spaced main surfaces extending in generally parallel, lateral directions and defining an interior therebetween, the interior being surrounded at least in part by a sidewall and the electronic apparatus having an input device supported on a portion of one of the main surfaces of the housing and defining a corresponding first portion of the interior of the housing and a heat producing element disposed at least in part within the first interior portion of the housing and, in operation, producing heat and discharging at least a part of the heat into the first interior portion of the housing, the heat dissipation structure comprising:

a heat transfer member having a heat reception portion, disposed at least in part within the first interior portion of the housing and thermally coupled to the heat producing element to receive at least part of the heat produced and discharged thereby, and a heat dissipation portion, disposed at least in part within a second interior portion of the housing which is displaced from the first interior portion in a lateral direction substantially parallel to the main surfaces of the housing, extending along the sidewall of the housing and displaced laterally from the first interior portion of the housing, the heat dissipating portion dissipating heat transmitted thereto through the heat transfer member from the heat reception portion into the second interior portion of the housing.

2. The heat dissipation structure according to claim 1, wherein the first and second portions of the heat transfer member extend in respective, first and second mutually perpendicular directions in either a T-shape or an L-shape configuration.

3. The heat dissipation structure according to claim 1, further comprising:

a first vent opening disposed in the first main surface of the housing at a position above the second interior portion of the housing and exhausting heat dissipated into the second interior portion of the housing to an exterior of the housing.

4. The heat dissipation structure according to claim 3, further comprising:

a second vent opening in a second main surface of the housing, lower than and opposed to the first main surface thereof, disposed therein at a position beneath the second interior portion of the housing and affording a flow of ambient air from an exterior of the housing and into the second interior portion of the housing for exhaust through the first vent opening of the upper main surface.

5. The heat dissipation structure according to claim 1, wherein the heat dissipation portion of the heat transfer member is of a channel-shaped cross-section in a plane transverse to the second direction.

6. The heat dissipation structure according to claim 1, wherein the heat transfer member has a T-shape or an L-shape configuration in a plane parallel to the main surface of the housing.

7. The heat dissipation structure according to claim 1, wherein the input device comprises a keyboard.

8. The heat dissipation structure according to claim 1, wherein:

the sidewall further comprises a rear sidewall portion;

the first interior portion of the housing is disposed centrally within the interior of the housing; and the second interior portion of the housing is disposed adjacent the rear sidewall portion of the sidewall.

9. The heat dissipation structure according to claim 8, wherein the first main surface of the housing has a first vent opening, disposed therein adjacent the rear side wall portion, in communication with the second interior portion of the housing and exhausting heat dissipated into the second interior portion of the housing to an exterior of the housing.

10. The heat dissipation structure according to claim 9, wherein the housing further comprises a second main surface opposite the first main surface and having a second vent opening disposed therein adjacent the rear side wall portion in communication with the second interior portion of the housing and affording a flow of ambient air from an exterior of and into the second interior portion of the housing for exhaust through the first vent opening of the upper main surface.

11. The heat dissipation structure according to claim 6, wherein the heat dissipation portion of the heat transfer member includes at least a portion extending transversely to the heat reception portion and the first main surface and in parallel to the rear side wall portion of the housing.

12. The heat dissipation structure according to claim 11, wherein the heat dissipation portion is of a substantially square cross-section.

13. An electronic apparatus comprising:
  a housing having spaced main surfaces extending in generally parallel, lateral directions and defining an interior therebetween;
  a heat producing element disposed in the interior and, the heat producing element, in operation, producing heat;
  an input device disposed in a position overlying at least a portion of the heat producing element; and
  a heat transfer element comprising:
    a heat reception portion thermally coupled to, and receiving at least part of the heat produced by, the beat producing element, and
    a heat dissipation portion displaced laterally from the heat reception portion and from the heat producing element and the input device and at least a portion thereof being disposed within the interior of the housing, the heat dissipation portion receiving heat transferred laterally through the heat transfer element from the heat reception portion and dissipating the heat received thereby in a direction away from the heat producing element.

14. The electronic apparatus according to claim 13, wherein heat dissipated by the heat dissipation portion is discharged to an exterior of the housing.

15. The electronic apparatus according to claim 14, wherein the heat is discharged to an exterior of the housing, at least in part, by conduction through a sidewall of the housing.

16. The electronic apparatus according to claim 14, wherein the heat is discharged to an exterior of the housing, at least in part by convection flow through vents in the housing.

17. The electronic apparatus according to claim 16, wherein the vents provide a direction of convection flow transverse to the direction of heat transfer, through the heat transfer element, from the heat reception portion thereof to the heat dissipation portion thereof.

18. The electronic apparatus according to claim 13, said unit device is a keyboard.

19. The heat dissipation structure according to claim 1, wherein the second interior portion is bounded along a side thereof remote from the first interior portion by a part of the sidewall.

20. An electronic apparatus as recited in claim 13, wherein:
  the heat producing element is mounted on a circuit board made of a material having an electrical conductance level of an insulator; and
  the heat transfer element has a thermal conductance corresponding to that of an electrically conducting material and exceeds a thermal conductance of the circuit board.

21. The electronic apparatus as recited in claim 13, wherein the heat transfer element is made of a heat conductive metal.

22. The electronic apparatus as recited in claim 21, wherein the heat conductive metal comprises a selected one of aluminum and copper metals.

23. A heat dissipation structure in a housing of an electronic apparatus, the housing having an interior surrounded at least in part by a sidewall and the electronic apparatus having an input device supported on a portion of a first main surface of the housing and defining a corresponding first portion of the interior of the housing and a heat producing element disposed at least in part within the first interior portion of the housing and, in operation, producing heat and discharging at least a part of the heat into the first interior portion of the housing, the heat dissipation structure comprising:
  a heat transfer member having a heat reception portion, disposed at least in part within the first interior portion of the housing and thermally coupled to the heat producing element to receive at least part of the heat produced and discharged thereby, and a heat dissipation portion, disposed at least in part within a second interior portion of the housing and extending along the sidewall of the housing and displaced from the first interior portion of the housing, the heat dissipating portion dissipating heat transmitted thereto through the heat transfer member from the heat reception portion into the second interior portion of the housing, wherein the second interior portion is displaced from the first interior portion in a lateral direction substantially parallel to the first main surface of the housing.

24. An electronic apparatus comprising:
  a housing enclosing a heat producing element in a first portion of an interior of the housing and having a main surface, the heat producing element, in operation, producing and discharging heat into the first interior portion;
  an input device disposed in a position overlying at least a portion of the heat producing element; and
  a heat transfer element comprising:
    a heat reception portion thermally coupled to the first interior portion and receiving at least part of the heat produced and discharged by the heat producing element, and
    a heat dissipation portion having at least a part thereof disposed within the interior of the housing at a second position displaced in a lateral direction, substantially parallel to the main surface of the housing, from the first interior portion and from the heat producing element and the input device, the heat dissipation portion receiving heat transferred thereto through the heat transfer element from the heat reception portion and dissipating the heat received thereby in a direction away from the heat producing element.

25. An electronic apparatus, comprising:
  a housing having upper and lower main surfaces defining an interior thereof and a sidewall surrounding at least a part of the interior;
  an electronic heat producing element, in operation, producing heat which is discharged into a first portion of the interior, a second portion of the interior adjacent a corresponding portion of the sidewall being displaced in a lateral direction, substantially parallel to the upper and lower main surfaces, from the first interior portion and comprising a heat discharge portion exhausting heat to the exterior of the housing; and a heat transfer element comprising a heat reception portion thermally coupled to the first interior portion, a heat dissipation portion thermally coupled to the second interior portion and a central transfer portion, extending laterally between and interconnecting the heat reception and heat dissipation portions, transferring heat received by the heat reception portion laterally to the heat dissipation portion for dissipation into, and discharge from, the second interior portion.

* * * * *

UNITED STATES PATENT AND TRADEMARK OFFICE
CERTIFICATE OF CORRECTION

PATENT NO.    : 6,226,180 B1
DATED         : May 1, 2001
INVENTOR(S)   : Akira Ueda et al.

It is certified that error appears in the above-identified patent and that said Letters Patent is hereby corrected as shown below:

<u>Column 9,</u>
Lines 65-66, change "first portion of the interior" to -- first interior portion --.

<u>Column 10,</u>
Line 21, change "first" to -- heat reception portion -- and change "second portions" to -- heat dissipation portion --.

<u>Column 11,</u>
Line 26, change "beat" to -- heat --.

Signed and Sealed this

Twenty-first Day of January, 2003

JAMES E. ROGAN
*Director of the United States Patent and Trademark Office*